Patented May 20, 1941

2,242,237

UNITED STATES PATENT OFFICE 2,242,237

SYNTHESIS OF 2-AMINO THIAZOLES

Walter G. Christiansen, Glen Ridge, N. J., assignor to E. R. Squibb & Sons, New York, N. Y., a corporation of New York No Drawing. Application January 13, 1940, Serial No. 313,793

12 Claims. (Cl. 260—302)

This invention relates to, and has for its object the provision of, an improved method of preparing 2-amino-4-Y-(meta)-thiazoles, wherein Y represents hydrogen, alkyl (preferably lower alkyl) or aryl (preferably phenyl); especially an improved method of preparing 2-amino-thiazole. The 2-amino-4-Y-thiazoles are valuable intermediates for the production of chemotherapeutic agents.

2-amino-thiazole has been prepared heretofore by reacting $\alpha,\beta$-dichlor-ethyl ether with thiourea: $\alpha,\beta$-dichlor-ethyl ether, however, is not commercially available, and its production in quantity involves hazardous and/or expensive procedures. 2-amino-thiazole has also been prepared heretofore by reacting $\beta$-chloracetal with thiourea, the chloracetal being obtained, for example, from $\alpha,\beta$-dichloro-ethyl acetate.

It has been found that 2-amino-thiazole may be easily and efficiently prepared by reacting an $\alpha,\beta$-dihalo (preferably dichloro)-ethyl acetate directly with thiourea, elimination of the conversion of the halo ester into the halo acetal, and of the separation and isolation of the latter, being obviously of great practical importance. The $\alpha,\beta$-dihalo (preferably dichloro)-ethyl acetate is readily obtainable by the low-temperature addition of a halogen to vinyl acetate (cf. British Patent 325,115), the latter being an inexpensive, commercially-available compound. It has also been found that the dihalo-ethyl acetate prepared from vinyl acetate does not have to be isolated as such for reaction with thiourea; thus, the entire reaction mixture obtained by the addition of chlorine to vinyl acetate, preferably after being freed of excess chlorine, can be reacted directly with thiourea. This is an additional practical advantage, since the dihaloethyl acetates are powerful lachrymators, and it is highly desirable that the handling of them as intermediates be minimized.

Manifestly, this method of preparing 2-aminothiazole is applicable to the preparation of 2-amino-4-Y-thiazoles generally (Y having the meaning given hereinbefore); thus, a 2-amino-4-Y-thiazole may be prepared by reacting thiourea with an $\alpha,\beta$-dihalo-$\beta$-Y-ethyl ester of a lower fatty acid, obtainable by the addition of a halogen to the corresponding $\beta$-Y-vinyl ester of a lower fatty acid, for example by the procedure of British Patent 325,115.

The 2-amino-4-Y-thiazoles as isolated from the reaction mixture of this as well as of prior methods, usually contains impurities, such as alkali metal halides, organic by-products, and/or possibly alkali, the amino thiazole content varying from as low as 60% to above 90%. While it is possible to use the product in this unrefined form, it is a relatively simple matter to produce products of exceptionally high purity from the reaction products of this invention. This can be done by the organic solvent procedures well known to those skilled in the art, or still better by distillation (including sublimation) under reduced pressure.

The following examples are illustrative of the invention:

Example 1

80 g. distilled $\alpha,\beta$-dichloro-ethyl acetate (b. p. 62–67° C./11 mm. or 162° C. at atmospheric pressure) is added dropwise, while stirring, to a solution of 46.4 g. thiourea in 100 cc. water heated to 100° C.; and the reaction mixture is maintained at 100° C. for three hours. The resulting solution is cooled to 10–15° C., 150 cc. of a concentrated aqueous solution of sodium hydroxide is added, and the product separating from the solution is filtered and dried. The crude product (weight 53.3 g.) may be refined by heating at 150–190° C. in vacuo (3 mm. mercury or less), the 2-amino-thiazole subliming into the receiver as a white solid melting at 89.5–90.5° C., and a mixture of sodium chloride and carbonaceous material remaining as a residue in the subliming flask. The yield is 44 g. (86.5% of the theoretical).

Example 2

80 g. crude $\alpha,\beta$-dichloro-ethyl acetate (obtained by treating vinyl acetate with an excess of chlorine and removing the excess by applying vacuum to the reaction vessel, or by blowing nitrogen through it) is reacted with a solution of 46.4 g. thiourea in 100 cc. water in the manner described in Example 1; after heating for three hours at 100° C., 150 cc. of a concentrated aqueous solution of sodium hydroxide is added; and the product which separates from solution is drained on a Buchner funnel and dried. The crude product (weight 50 g.) may be refined as described in Example 1, 43.5 g. of 2-aminothiazole being obtained as a white solid melting at 89.5–90.5° C. (the yield being 84% of the theoretical).

Example 3

2-amino-thiazole is prepared by reacting $\alpha,\beta$-dibromoethyl acetate (cf. British Patent 325,115) with thiourea in the manner described in Example 1.

*Example 4*

2-amino-thiazole is prepared by reacting α,β-dibromoethyl butyrate (cf. British Patent 325,115) with thiourea in the manner described in Example 1.

*Example 5*

2-amino-4-methyl-thiazole is prepared by reacting α,β-dichloro-propyl acetate with thiourea in the manner described in Example 1.

*Example 6*

2-amino-4-phenyl-thiazole is prepared by reacting α,β-dibromo-phenethyl acetate with thiourea in the manner described in Example 1.

The invention may be variously otherwise embodied within the scope of the appended claims.

I claim:

1. The method of preparing a 2-amino-4-Y-thiazole, which comprises reacting thiourea with an α,β-dihalo-β-Y-ethyl ester of a lower fatty acid, Y representing a member of the group consisting of hydrogen, alkyl, and aryl.

2. The method of preparing a 2-amino-4-Y-thiazole, which comprises reacting thiourea with the crude product obtained by the addition of a halogen to a β-Y-vinyl ester of a lower fatty acid, Y representing a member of the group consisting of hydrogen, alkyl, and aryl.

3. The method of preparing a 2-amino-4-Y-thiazole, which comprises reacting thiourea with an α,β-dichloro-β-Y-ethyl ester of a lower fatty acid, Y representing a member of the group consisting of hydrogen, alkyl, and aryl.

4. The method of preparing a 2-amino-4-Y-thiazole, which comprises reacting thiourea with the crude product obtained by the addition of chlorine to a β-Y-vinyl ester of a lower fatty acid, Y representing a member of the group consisting of hydrogen, alkyl, and aryl.

5. The method of preparing 2-amino-thiazole which comprises reacting thiourea with an α,β-dihalo-ethyl ester of a lower fatty acid.

6. The method of preparing 2-amino-thiazole which comprises reacting thiourea with the crude product obtained by the addition of halogen to a vinyl ester of a lower fatty acid.

7. The method of preparing 2-amino-thiazole which comprises reacting thiourea with α,β-dichloro-ethyl acetate.

8. The method of preparing 2-amino-thiazole which comprises reacting thiourea with the crude product obtained by the addition of chlorine to vinyl acetate.

9. The method of preparing a 2-amino-4-Y-thiazole, which comprises heating an aqueous solution of thiourea with an α,β-dihalo-β-Y-ethyl ester of a lower fatty acid, Y representing a member of the group consisting of hydrogen, alkyl, and aryl.

10. The method of preparing a 2-amino-4-Y-thiazole, which comprises heating an aqueous solution of thiourea with the crude product obtained by the addition of a halogen to a β-Y-vinyl ester of a lower fatty acid, Y representing a member of the group consisting of hydrogen, alkyl, and aryl.

11. The method of preparing 2-amino-thiazole which comprises heating an aqueous solution of thiourea with α,β-dichloro-ethyl acetate.

12. The method of preparing 2-amino-thiazole which comprises heating an aqueous solution of thiourea with the crude product obtained by the addition of chlorine to vinyl acetate.

WALTER G. CHRISTIANSEN.